US008077759B2

(12) United States Patent
Kent et al.

(10) Patent No.: US 8,077,759 B2
(45) Date of Patent: Dec. 13, 2011

(54) METHOD AND APPARATUS FOR NEW CELL IDENTIFICATION IN A WCDMA NETWORK WITH A GIVEN NEIGHBOR SET

(75) Inventors: Mark Kent, Vista, CA (US); Francis Swarts, San Diego, CA (US); Uri Landau, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1002 days.

(21) Appl. No.: 11/399,908

(22) Filed: Apr. 7, 2006

(65) Prior Publication Data

US 2007/0237212 A1    Oct. 11, 2007

(51) Int. Cl.
*H04B 1/00*     (2006.01)
*H04L 7/00*     (2006.01)

(52) U.S. Cl. ........ 375/149; 375/145; 375/150; 375/355; 375/362

(58) Field of Classification Search .......... 375/260, 375/267, 354, 355, 362, 371, 142, 145, 147, 375/149, 150, 343
See application file for complete search history.

(56) References Cited

U.S. PATENT DOCUMENTS

| | | | |
|---|---|---|---|
| 7,088,825 B2 * | 8/2006 | Sambhwani et al. | 380/268 |
| 2003/0039228 A1 * | 2/2003 | Shiu et al. | 370/331 |
| 2003/0223384 A1 | 12/2003 | Sengupta et al. | |
| 2004/0161020 A1 * | 8/2004 | Mathew et al. | 375/149 |

FOREIGN PATENT DOCUMENTS

| | | |
|---|---|---|
| CN | 1539207 | 10/2004 |
| WO | 02/082690 | 10/2002 |

OTHER PUBLICATIONS

3GPP TSG RAN WG1: "Ts 25.215 Physical layer—Measurements (FDD)" [Online] Sep. 1999, pp. 1-24, XP002442247.
Hanada, Y et al; "Fast Cell Search Algorithm in Idle Mode for Inter-cell Asynchronous W-CDMA Mobile Radio"; Cryptologia, Laguna Hills, CA, US; vol. E83B, no. 8, Aug. 2000; pp. 1610-1618; XP000987025.

* cited by examiner

*Primary Examiner* — David Lugo
(74) *Attorney, Agent, or Firm* — McAndrews, Held & Malloy, Ltd.

(57) ABSTRACT

A method and an apparatus for new cell identification in a WCDMA network with a given neighbor set are described. Aspects of a system for new cell identification in a WCDMA network with a given neighbor set may include a baseband processor that enables determination of a primary synchronization position and at least one scrambling code based on received configuration information from one or more base stations. The baseband processor may also enable determination of a slot boundary in at least one signal received from the one or more base stations based on the determined primary synchronization position. The system may also include a multipath detector that enables unscrambling of the received at least one signal based on the determined slot boundary and at least a portion of the one or more scrambling codes.

30 Claims, 10 Drawing Sheets

METHOD AND APPARATUS FOR NEW CELL IDENTIFICATION IN A WCDMA NETWORK WITH A GIVEN NEIGHBOR SET

CROSS-REFERENCE TO RELATED APPLICATIONS/INCORPORATION BY REFERENCE

This application makes reference to:
U.S. patent application Ser. No. 11/173,854 filed on Jun. 30, 2005; and
U.S. patent application Ser. No. 11/399,953 filed on even date herewith.

Each of the above applications is hereby incorporated herein by reference in its entirety.

FIELD OF THE INVENTION

Certain embodiments of the invention relate to wireless communication. More specifically, certain embodiments of the invention relate to a method and system for new cell identification in a WCDMA network with a given neighbor set.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

WCDMA networks may allow a mobile handset to communicate with a multiple number of base stations. This may take place, for example, during a soft-handoff from one base station to another base station that utilizes the same frequency band. On occasions, there may be handoffs from one base station to another where the two base stations use different frequencies. This may occur, for example, when a mobile station interfaces with a different wireless service provider, or for hotspots where one service provider may need to use more than one frequency. In these cases, the mobile handset may need to tune in to the frequency of the new base station. This may require additional circuitry to be able to synchronize to a second frequency of the second base station while still using the first frequency for communicating with the first base station. The additional synchronization circuitry may be an undesirable extra cost for the mobile handset.

In some conventional WCDMA networks, synchronization and timing acquisition between a mobile handset and a base station may comprise at least a 3-step process. The first step is referred to as a slot timing process. The second step may be referred to as a frame timing process. The third step may involve determining the scrambling code utilized by the base station that was identified during the slot timing and frame timing processes. A signal scrambled at a base station by utilizing a selected scrambling code may be unscrambled by utilizing the selected scrambling code at the mobile terminal. The mobile terminal may utilize a plurality of potential scrambling codes when determining which of the potential scrambling codes is utilized at the identified base station. The mobile terminal may utilize the selected scrambling code to unscramble a spread spectrum signal received from the base station.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for new cell identification in a WCDMA network with a given neighbor set, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
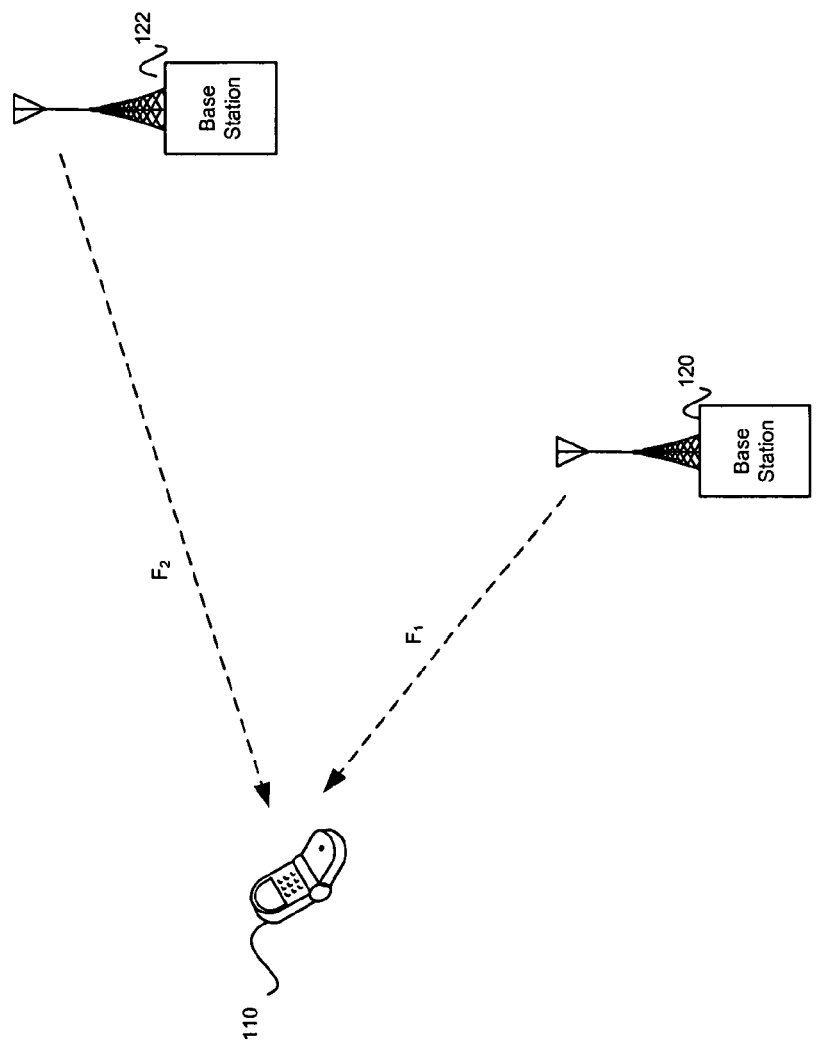
FIG. 1A is an exemplary diagram illustrating a WCDMA handset communicating with two WCDMA base stations, which may be utilized in connection with an embodiment of the invention.

Certain embodiments of the invention may be found in a method and system for new cell identification in a WCDMA network with a given neighbor set. Aspects of the method may comprise at most a two-step method for achieving synchronization and timing acquisition between a mobile terminal and a base station. In various embodiments of the invention a mobile terminal may have achieved synchronization and timing acquisition with at least one base station. The base station may communicate information about neighboring base stations in a neighbor set list.

In some conventional WCDMA networks, synchronization and timing acquisition between a mobile handset and a base station may comprise at least a 3-step process. The first step is referred to as a slot timing process. A WCDMA frame may comprise 15 slots. A WCMDA frame may also be referred to as a spread spectrum frame, or a frame. The individual slots within a 15-slot frame may be labeled slot 0, slot 1, slot 2, . . . , slot 14. Slots may be transmitted at a 1,500 Hz rate, or 1 slot per 2/3 milliseconds (ms). The transmitted slot may contain a primary synchronization code (PSC). A single PSC may be transmitted during each of the 15 slots within a WCDMA frame, such that the PSC transmitted during slot 0 may contain the same information as the PSC transmitted during slots 1, 2, . . . , 14. The PSC may be utilized to determine slot timing within the communication system. The determined slot timing may correspond to a primary synchronization position. When slot timing is achieved, the base station and mobile handset may be able to synchronize clock timing, based on the primary synchronization position, and to determine a time instant that indicates the beginning of a transmitted slot.

While slot synchronization may enable a mobile handset and base station to mutually determine a time instant corresponding to the beginning of transmission of a slot, slot synchronization may not enable a mobile terminal, for example, to determine when a base station is transmitting slot 0 within a WCDMA frame.

A second step in the synchronization and timing acquisition process may be referred to as a frame timing process. A transmitted slot may also comprise a secondary synchronization code (SSC). An SSC may be utilized to determine which slot within a WCDMA frame corresponds to slot 0, slot 1, slot 2, . . . , or slot 14. The SSC may comprise a sequence of 15 slots such that an $SSC_0$ may represent an SSC transmitted during slot 0, an $SSC_1$ may represent an SSC transmitted during slot 1, an $SSC_2$ may represent an SSC transmitted during slot 2, and an $SSC_{14}$ may represent an SSC transmitted during slot 14, for example. When slot timing and frame timing are achieved, the base station and mobile handset may be able to synchronize clock timing and to determine time instants that indicate the beginning of a transmitted slot, which may indicate the beginning of a transmitted WCDMA frame.

After achieving frame timing, a mobile handset may be able to identify an individual base station among a plurality of base stations that may transmit a WCDMA signal to the mobile handset. However, an individual base station within a WCDMA network may transmit a signal that is scrambled by a spreading code. A scrambling code may comprise a binary sequence of bits that may be utilized to scramble a signal to produce a spread spectrum signal. The signal may be scrambled by utilizing a Gold code, for example. The base station may select a scrambling code from a plurality of potential scrambling codes. An individual base station may select a Gold code from among a group of 8 potential Gold codes that may be utilized to scramble a signal by the base station, for example.

In a third step in the synchronization and timing acquisition process, a mobile terminal may determine which scrambling code may be utilized by the individual base station that was identified during the slot timing and frame timing processes. A signal, scrambled at a base station by utilizing a selected scrambling code, may be unscrambled by utilizing the selected scrambling code at the mobile terminal. The mobile terminal may utilize each potential scrambling code that may be utilized at an identified base station. The mobile terminal may determine a signal strength associated with application of each potential scrambling code to the received signal, for example. Based on the signal strength comparison, for example, the mobile terminal may select a scrambling code utilized at the identified base station. The mobile terminal may also utilize the selected scrambling code to unscramble a spread spectrum signal received from the base station.

FIG. 1A is an exemplary diagram illustrating a WCDMA handset communicating with two WCDMA base stations, which may be utilized in connection with an embodiment of the invention. Referring to FIG. 1A, there is shown a mobile terminal 110 and base stations 120 and 122. The base stations 120 and 122 may be located within different cells within a WCDMA network. The mobile terminal 110 may receive communications from the base station 120 using frequency $F_1$. From the perspective of the mobile terminal 110, the cell associated with base station 120 may be referred to as an active cell. The cell associated with the base station 122 may be referred to as a neighboring cell. The base station 120 may communicate a neighbor set list to the mobile terminal 110. The neighbor set list may comprise configuration information related to the base station 122. The mobile terminal 110 may utilize the configuration information to establish communications with the base station 122.

As the mobile terminal moves away from the base station 120, the next nearest base station that may handle the connection to the mobile terminal 110 may be the base station 122. However, the base station 122 may use frequency $F_2$ rather than frequency $F_1$. Accordingly, the mobile terminal 110 may need to tune in to a new frequency so that it may be handed off to the base station 122. This type of hand-off may be referred to as an inter-frequency hand-off. The base stations 120 and 122 may be part of one wireless network that may use different frequencies in order to be able to handle a large traffic load within a limited geographical area. Alternatively, the base stations 120 and 122 may be parts of different wireless networks. Inter-frequency handoffs may also occur when a WCDMA network needs to handoff a mobile device to a second generation (2G) network.

Figure 1B:
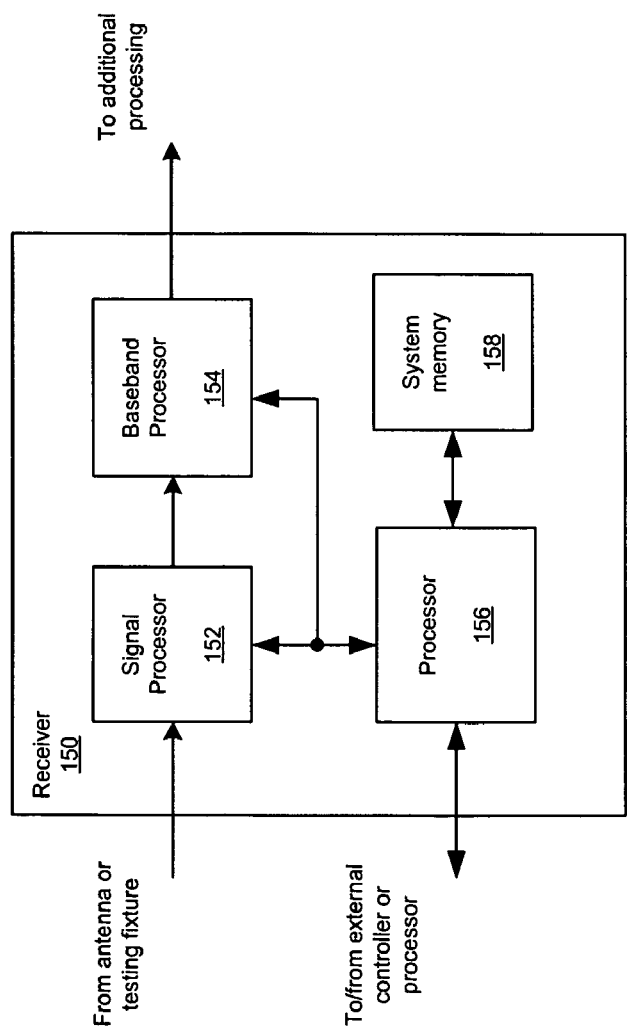
FIG. 1B is a block diagram of an exemplary RF receiver system, which may be utilized in connection with an embodiment of the invention.

FIG. 1B is a block diagram of an exemplary RF receiver system, which may be utilized in connection with an embodiment of the invention. Referring to FIG. 1B, there is shown a RF receiver system 150 that may comprise a signal processor block 152, a baseband processor block 154, a processor 156, and a system memory 158. The signal processor block 152 may comprise suitable logic, circuitry, and/or code that may enable receiving of RF signals. The signal processor block 152 may be coupled to an antenna for signal reception. The signal processor block 152 may demodulate a received signal before further processing. Moreover, the signal processor block 152 may comprise other functions, for example, filtering the received signal, amplifying the received signal, and/or downconverting the received signal to an analog baseband signal. The signal processor block 152 may also digitize the analog baseband signal to a digital baseband signal, and digitally process the digital baseband signal, for example, to filter the digital baseband signal.

The baseband processor block 154 may comprise suitable logic, circuitry, and/or code that may enable processing of the digital baseband signals communicated by the signal processor block 152. The processor 156 may comprise suitable logic, circuitry, and/or code that may enable controlling of the operations of the signal processor block 152 and/or the baseband processor block 154. For example, the processor 156 may be utilized to update and/or modify programmable parameters and/or values in a plurality of components, devices, and/or processing elements that may be in the signal processor block 152 and/or the baseband processor block 154. For example, there may be programmable gain amplifiers in the signal processor block 152. Control and/or data information may be transferred from at least one processor external to the RF receiver system 150 to the processor 156. Similarly, the processor 156 may transfer control and/or data information to at least one processor external to the RF receiver system 150.

The processor 156 may utilize the received control and/or data information to determine a mode of operation of the signal processor block 152. For example, the processor 156 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the processor 156. This information stored in system memory 158 may be transferred to the signal processor block 152 from the system memory 158 via the processor 156. The system memory 158 may comprise suitable logic, circuitry, and/or code that may enable storage of a plurality of control and/or data information, including parameters needed to calculate frequencies and/or gain, and/or the frequency value and/or gain value.

Figure 2A:
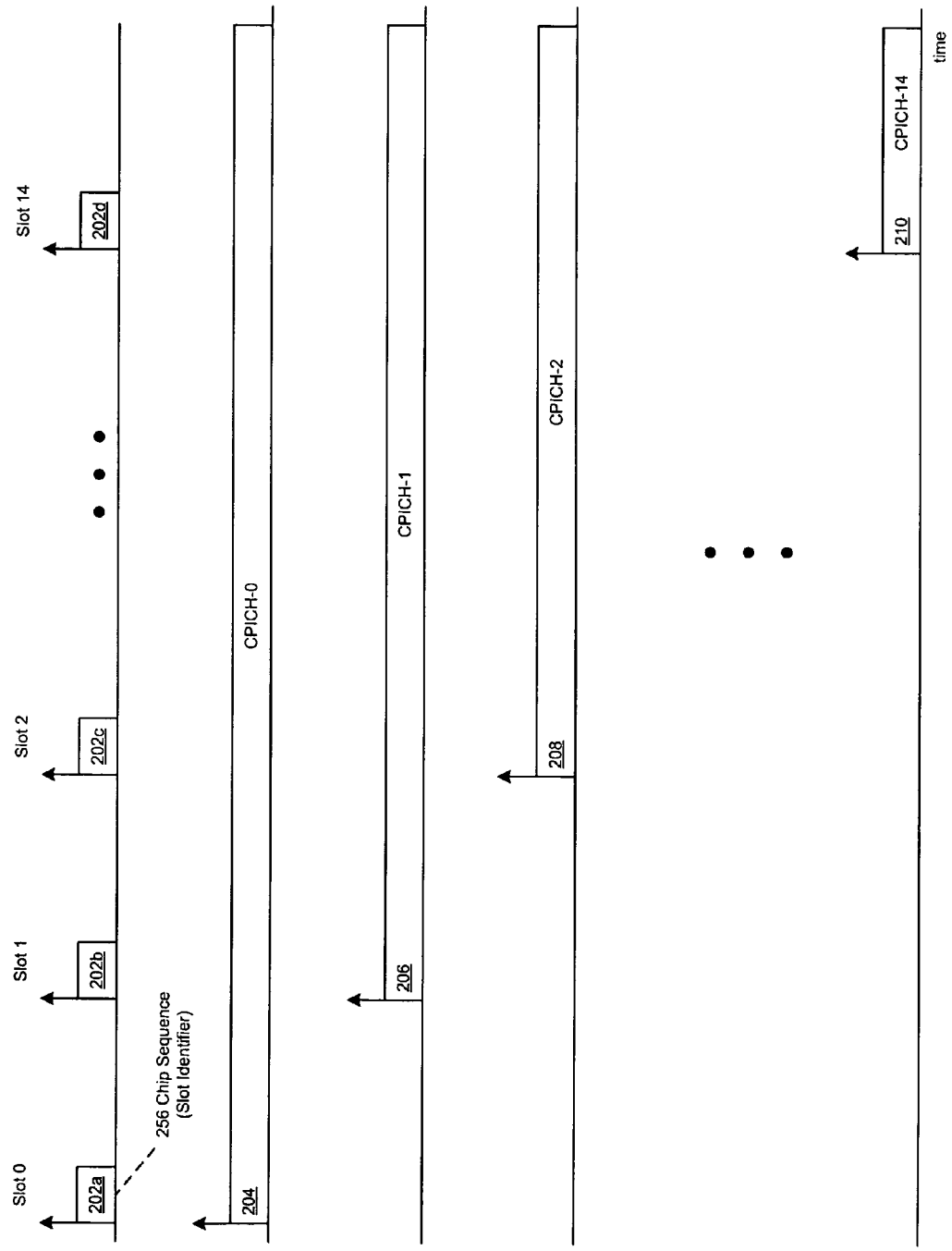
FIG. 2A is an exemplary illustration of slot synchronization, in accordance with an embodiment of the invention.

FIG. 2A is an exemplary illustration of slot synchronization, in accordance with an embodiment of the invention. Referring to FIG. 2A, there is shown a plurality of slot synchronization codes 202a, 202b, 202c, . . . , 202d, and a plurality of frames 204, 206, 208, . . . , 210. Also shown in FIG. 2A is a plurality of time instants Slot 0, Slot 1, Slot 2, . . . , Slot 14. The slot synchronization codes 202a, 202b, 202c, . . . , 202d may represent a PSC that may be transmitted during each of the 15 slots within a WCDMA frame, for example. The frames 204, 206, 208, . . . , 210 may comprise a plurality of slots, for example 15 slots, that may be utilized to transmit a common pilot channel (CPICH). The CPICH may comprise a determined sequence of bits that identify a base station 122. Each frame 204, 206, 208, . . . , 210 may represent a potential phase of the CPICH that is transmitted by the base station 122. For example, there may be 15 potential phases that may be labeled CPICH-0, CPICH-1, CPICH-2, . . . , CPICH-14. The frame 204 may correspond to the potential phase CPICH-0, for example. The frame 206 may correspond to the potential phase CPICH-1, for example. The frame 208 may correspond to the potential phase CPICH-2, for example. The frame 210 may correspond to the potential phase CPICH-14, for example. In FIG. 2A, the time instants Slot 0, Slot 1, Slot 2, . . . , Slot 14 may be defined in relation to the frame 204.

The base station 122 may transmit at least one of the frames 204, 206, 208, . . . , 210. The beginning of the frame 204 may correspond to the Slot 0 time instant. The beginning of the frame 204 may correspond to the beginning of slot 0 within the frame 204. Within a frame, a slot may comprise 2,560 chips. A frame may comprise 38,400 chips. The frame 206 may represent a time shifted version of the frame 204. The beginning of the frame 206 may correspond to the Slot 1 time instant. The beginning of the frame 206 may also correspond to the beginning of the slot 1 within the frame 204. The frame 208 may represent a time shifted version of the frame 204. The beginning of the frame 208 may correspond to the Slot 2 time instant. The beginning of the frame 208 may also correspond to the beginning of the slot 2 within the frame 204. The frame 210 may represent a time shifted version of the frame 204. The beginning of the frame 210 may correspond to the Slot 14 time instant. The beginning of the frame 210 may also correspond to the beginning of slot 14 within the frame 204.

A synchronization channel (SCH) may be utilized for transmitting PSCs, for example. A PSC may comprise 256 chips. The time duration for a PSC may correspond to 0.1 of the time duration of a slot within a frame. The time instant at which a slot synchronization code 202a, 202b, 202c, . . . , 202d begins may correspond to the beginning of a slot in a frame 204, 206, 208, . . . , 210. Thus, by detecting a PSC in a frame 204 received from a base station 122, a slot boundary within the frame 204 may be located.

The slot synchronization code 202a may occur during a time interval that corresponds to the beginning of slot 0 with respect to the frame 204. The slot synchronization code 202b may occur during a time interval that corresponds to the beginning of slot 1 with respect to the frame 204. The slot synchronization code 202c may occur during a time interval that corresponds to the beginning of slot 2 with respect to the frame 204. The slot synchronization code 202d may occur during a time interval that corresponds to the beginning of slot 14 with respect to the frame 204.

The slot synchronization code 202b may occur during a time interval that corresponds to the beginning of slot 0 with respect to the frame 206. The slot synchronization code 202c may occur during a time interval that corresponds to the beginning of slot 1 with respect to the frame 206. The slot synchronization code 202d may occur during a time interval that corresponds to the beginning of slot 13 with respect to the frame 206.

The slot synchronization code 202c may occur during a time interval that corresponds to the beginning of slot 0 with respect to the frame 208. The slot synchronization code 202d may occur during a time interval that corresponds to the beginning of slot 12 with respect to the frame 208.

The slot synchronization code 202d may occur during a time interval that corresponds to the beginning of slot 0 with respect to the frame 210.

While information associated with the slot synchronization codes 202a, 202b, 202c, . . . , 202d may be utilized to enable identification of a slot boundary, the information may not enable identification of which individual slot, among the plurality of slots contained in a frame, is slot 0, slot 1, slot 2, . . . , or slot 14.

Another example of a channel is a common control physical channel (CCPCH). A CCPCH may be utilized to transport information associated with a paging channel (PCH). The PCHs may be utilized to communicate control information from a base station 120, within an active cell, to a mobile terminal 110. Information associated with neighbor sets, which may also be referred to as neighbor lists or neighbor set lists, may be communicated via a PCH. The neighbor set may comprise a Gold code identifier, for example. The Gold code identifier may be used to enable the mobile terminal 110 to determine a scrambling code that may be utilized by the base station 122. The information contained within the neighbor set list may be utilized by the mobile terminal 110 to establish communications with a base station 122 within a neighboring cell.

Figure 2B:
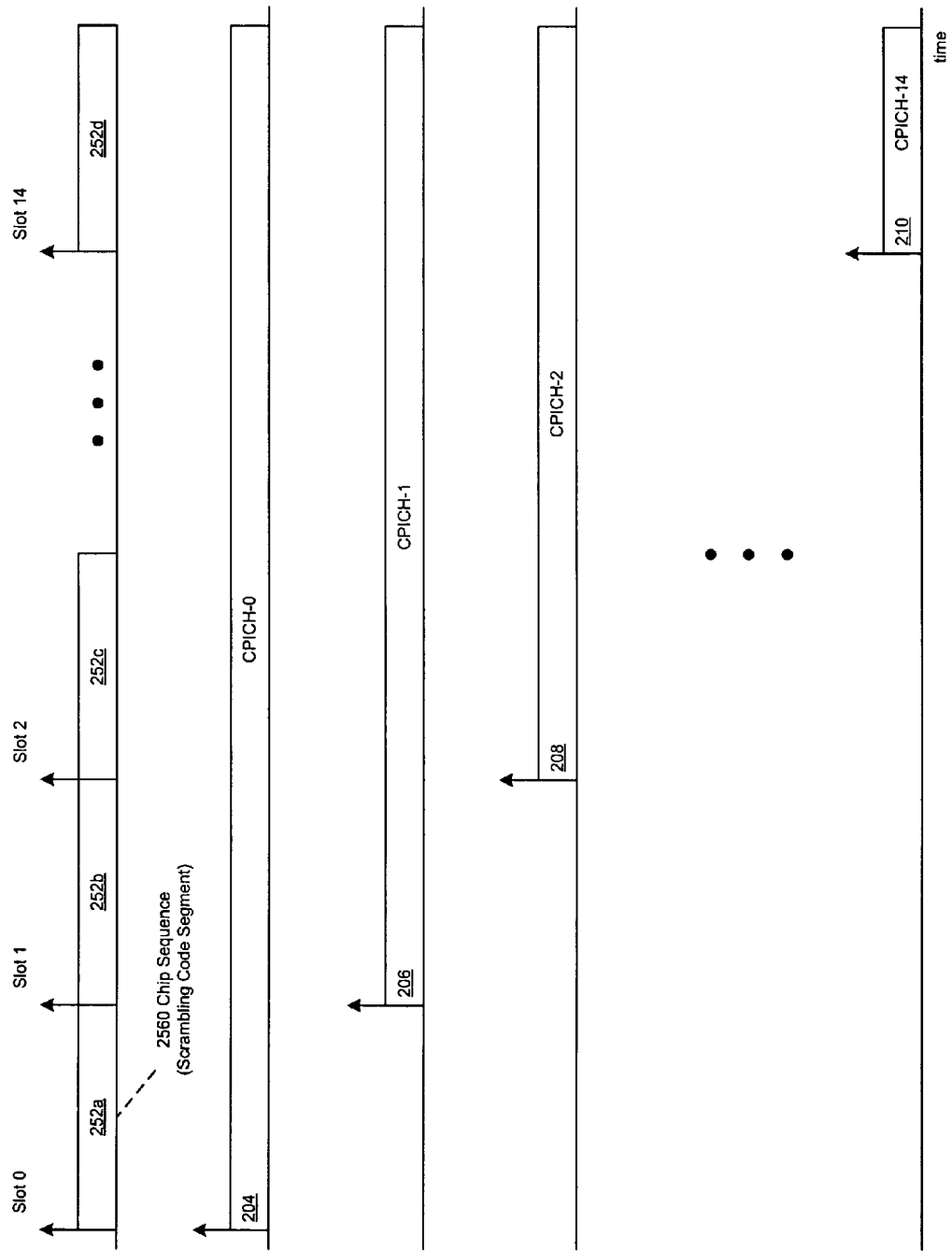
FIG. 2B is an exemplary illustration of frame synchronization, in connection with an embodiment of the invention.

FIG. 2B is an exemplary illustration of frame synchronization, in connection with an embodiment of the invention. Referring to FIG. 2B, there is shown a plurality of scrambling code segments 252a, 252b, 252c, . . . , 252d, and a plurality of frames 204, 206, 208, ..., 210. The frames 204, 206, 208, ..., 210 may be substantially as described in FIG. 2A. The plurality of scrambling code segments 252a, 252b, 252c, ..., 252d may represent a corresponding plurality of scrambling code segments $SCR_0$, $SCR_1$, $SCR_2$, ..., $SCR_{14}$. The scrambling code segment 252a may correspond to the scrambling code segment $SCR_0$, for example. The scrambling code segment 252b may correspond to the scrambling code segment $SCR_1$. The scrambling code segment 252c may correspond to the scrambling code segment $SCR_2$. The scrambling code segment 252d may correspond to the scrambling code segment $SCR_{14}$.

The scrambling code segment 252a may occur during a time interval that corresponds to slot 0 with respect to the frame 204. The scrambling code segment 252b may occur during a time interval that corresponds to slot 1 with respect to the frame 204. The scrambling code segment 252c may occur during a time interval that corresponds to slot 2 with respect to the frame 204. The scrambling code segment 252d may occur during a time interval that corresponds to slot 14 with respect to the frame 204.

Information associated with the scrambling code segment 252a, may be distinct in comparison to information associated with the scrambling code segments 252b, 252c, ..., 252d. Information associated with the scrambling code segment 252b, may be distinct in comparison to information associated with the scrambling code segments 252c, ..., 252d. Information associated with the scrambling code segment 252c, may be distinct in comparison to information associated with the scrambling code segment 252d. Consequently, a scrambling code segment among the plurality of scrambling code segments 252a, 252b, 252c, ..., 252d may be utilized to identify which slot, among the plurality of slots contained in a WCDMA frame 204, is slot 0, slot 1, slot 2, ..., or slot 14.

The scrambling code segment 252a may be utilized by a base station 122 in the neighboring cell to generate a spread spectrum signal when transmitting information during slot 0 within a WCDMA frame 204. The scrambling code segment 252b may be utilized to generate a spread spectrum signal when transmitting information during slot 1 within the WCDMA frame 204. The scrambling code segment 252c may be utilized to generate a spread spectrum signal when transmitting information during slot 2 within the WCDMA frame 204. The scrambling code segment 252d may be utilized to generate a spread spectrum signal when transmitting information during slot 14 within the WCDMA frame 204.

At a mobile terminal 110, the scrambling code segment 252a may be utilized to unscramble a spread spectrum signal when receiving information during slot 0 within a WCDMA frame 204. The scrambling code segment 252b may be utilized to unscramble a spread spectrum signal when receiving information during slot 1 within a WCDMA frame 204. The scrambling code segment 252c may be utilized to unscramble a spread spectrum signal when receiving information during slot 2 within a WCDMA frame 204. The scrambling code segment 252d may be utilized to unscramble a spread spectrum signal when receiving information during slot 14 within a WCDMA frame 204.

Aspects of the two step process may comprise a slot synchronization process, and a frame synchronization process. The two step process may enable the mobile terminal 110 to identify a base station 122 among a plurality of base stations in neighboring cells that may transmit a WCDMA signal to the mobile terminal 110. The first step in the two step process may comprise a slot timing process. Based on information contained within the neighbor set list received from a base station 120 within an active cell, the mobile terminal 110 may determine a scrambling code utilized by a base station 122 within a neighboring cell.

In the second step in the two step process, a scrambling code may be selected based on information contained in the neighbor set list. The selected scrambling code may then be utilized to achieve frame timing. The scrambling code may comprise a sequence of 15 slots such that an $SCR_0$ may represent a scrambling code segment utilized by the base station 122 to generate a spread spectrum signal that is transmitted during slot 0, for example. An $SCR_1$ may represent a scrambling code segment utilized to generate a spread spectrum signal that is transmitted during slot 1, an $SSC_2$ may represent a scrambling code segment utilized to generate a spread spectrum signal that is transmitted during slot 2, and an $SCR_{14}$ may represent a scrambling code segment utilized to generate a spread spectrum signal that is transmitted during slot 14, for example.

In various embodiments of the invention, each of the plurality of scrambling code segments $SCR_0$, $SCR_1$, $SCR_2$, ..., $SCR_{14}$ may be applied simultaneously, at a mobile terminal 110, during processing of a signal received from one or more base stations 120, 122. The mobile terminal 110 may determine a corresponding signal strength associated with the application of each of the plurality of scrambling code segments $SCR_0$, $SCR_1$, $SCR_2$, ..., $SCR_{14}$ to the one or more received signals. Based on a signal strength comparison, frame timing between the mobile terminal 110 and an identified base station 120 may be achieved within a one time slot duration. The plurality of scrambling code segments may be generated simultaneously by generating time shifted versions 206, 208 ... 210, of a scrambling code.

By contrast, in some conventional WCDMA networks, an SSC may be utilized to achieve frame timing before a scrambling code is determined. Thus, in these conventional WCDMA networks, a third step is required to determine the scrambling code. The two step method, in accordance with various embodiments of the invention, may enable a mobile terminal 110 to achieve synchronization and timing acquisition with a base station 122 in a neighboring cell faster than may be achieved when utilizing the conventional three step method. An exemplary embodiment of the invention may enable an integrated circuit (IC) device to utilize reduced power consumption in comparison to comparable IC devices that implement a three step method.

In various embodiments of the invention, the neighbor set list may be utilized to enable a mobile terminal 110 to utilize a selected scrambling code, and determined synchronization timing based on a two step process, to establish timing for the transmission of signals to the identified base station 122. The mobile terminal 110 may also utilize the selected scrambling code to unscramble a spread spectrum signal received from the identified base station 122.

A signal transmitted wirelessly from a base station 122 may encounter obstacles in a direct line of sight path to a receiving mobile terminal 110. The obstacles may each deflect at least a portion of the energy contained within the transmitted signal. The one or more reflections of the transmitted signal due to one or more corresponding obstacles may result in the multiple versions of the transmitted signal being received. The set of multiple versions may be referred to as a multipath cluster. An individual version within the multipath cluster may be referred to as an individual path signal. One or more of the individual path signals may be received at the mobile terminal 110 at distinct time instants, or at approximately the same time instant. The time duration between a time instant at which the first individual path signal within the multipath cluster may be received by the mobile terminal 110, and a subsequent time instant at which a final individual path signal may be received may be referred to as a delay spread.

In various embodiments of the invention, a plurality of time shifted versions of a scrambling code segment may be generated simultaneously. For example, a scrambling code segment $SCR_0$ may be generated beginning at a time instant $t_0$. The scrambling code segment $SCR_0$ may also be generated beginning at a time instant $t_1$. The scrambling code segment $SCR_0$ may be transmitted for a third time at a time instant $t_2$. The scrambling code segment $SCR_0$ may also be generated beginning at a time instant $t_{14}$.

In various embodiments of the invention, the simultaneous generation of a plurality of time shifted versions of a scrambling code segment may enable detection of individual path signals associated with a multipath cluster. At least one of the plurality of time shifted versions of the scrambling code segment may be utilized to enable unscrambling, of information contained in a received signal at a mobile terminal 110.

In various embodiments of the invention, the repeated generation of a scrambling code segment at distinct time instants may enable detection of individual path signals associated with a multipath cluster. The time duration between the time instant at which a scrambling code segment is first transmitted, and a subsequent time instant at which a repeated transmission of the scrambling code segment occurs may comprise a delay spread.

Figure 3:
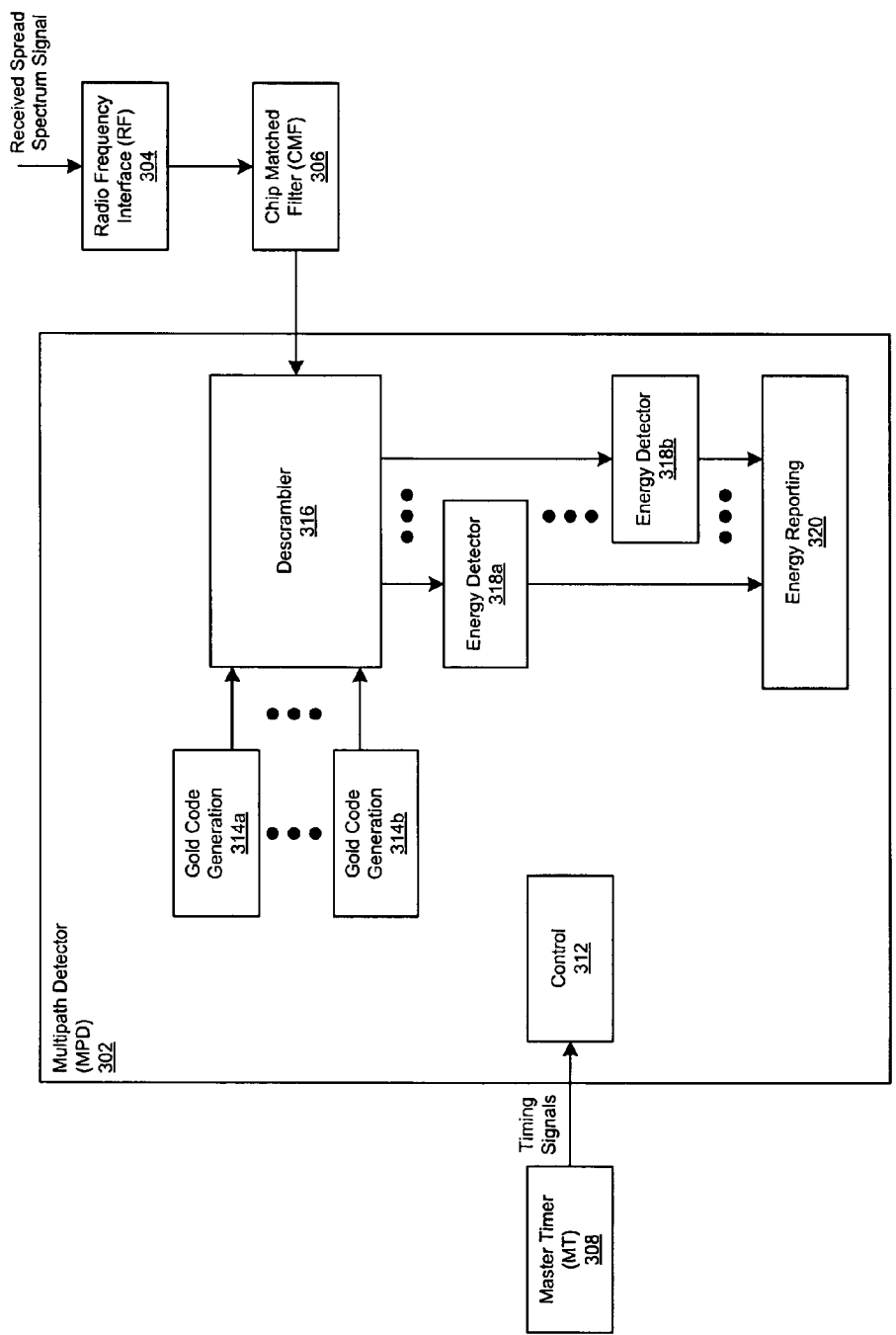
FIG. 3 is a block diagram of a system for new cell identification in a WCDMA network with a given neighbor set, in accordance with an embodiment of the invention.

FIG. 3 is a block diagram of a system for new cell identification in a WCDMA network with a given neighbor set, in accordance with an embodiment of the invention. Referring to FIG. 3, there is shown a multipath detector (MPD) 302, a radio frequency interface (RF) 304, a chip matched filter (CMF) 306, and a master timer (MT) 308. The MPD 302 may further comprise a control block 312, a plurality of Gold code generation blocks 314a . . . 314b, a descrambler block 316, a plurality of energy detector blocks 318a . . . 318b, and an energy reporting block 320. In various embodiments of the invention, the MPD 302, RF block 304, CMF block 306, and MT block 308 may be located within a mobile terminal 110.

The RF block 304 may comprise suitable logic, circuitry, and/or code that may enable amplification and conversion of an analog RF signal, received via a WCDMA channel for example, down to baseband frequency. The RF block 304 may comprise an analog-to-digital (A/D) converter that may be utilized to generate a digital equivalent of the received analog signal.

The CMF block 306 may comprise suitable logic, circuitry, and/or code that may enable filtering of the output from the RF block 304 and to produce complex in-phase and quadrature components (I, Q) of the filtered signal. In an embodiment of the invention, the CMF block 306 may comprise a pair of digital filters that are adapted to filter the I and Q components to within, for example, the 3.84 MHz bandwidth of WCDMA baseband signal.

The MT block 308 may comprise suitable logic and/or circuitry that may enable generation of clocking signals to the MPD 302. In an exemplary embodiment of the invention, the MT block 308 may generate a 15.36 MHz clock signal.

The MPD 302 may comprise suitable logic, circuitry, and/or code that may enable synchronization and timing acquisition utilizing the two step method. The MPD 302 may also enable multipath detection. Multipath detection may comprise detection of individual path signals within a multipath cluster.

The control block 312 may comprise suitable logic, circuitry, and/or code that may enable control of operations within the MPD 302. The control block may control the generation of Gold codes, the unscrambling of received spread spectrum signals, the detection of energy levels associated with the unscrambled signals, and the determination of a maximum energy level among a plurality of detected energy levels.

The Gold code generation block 314a may comprise suitable logic, circuitry, and/or code that may enable generation of one or more scrambling code segments. When the MPD 302 is utilized to enable synchronization and timing acquisition, for example, the Gold code generation block 314a may enable generation of the scrambling code segment $SCR_0$ from among the plurality of scrambling code segments $SCR_0$, $SCR_1$, $SCR_2$, . . . , $SCR_{14}$. When the MPD 302 is utilized to enable multipath detection, for example, the Gold code generation block 314a may enable generation of the scrambling code segment $SCR_0$ from among the plurality of scrambling code segments $SCR_0$, $SCR_1$, $SCR_2$, . . . , $SCR_{14}$. The scrambling code segment $SCR_0$ may be generated at a time instant $t_0$.

The Gold code generation block 314b may comprise suitable logic, circuitry, and/or code that may enable generation of one or more scrambling code segments. When the MPD 302 is utilized to enable synchronization and timing acquisition, for example, the Gold code generation block 314b may enable generation of the scrambling code segment $SCR_{14}$ from among the plurality of scrambling code segments $SCR_0$, $SCR_1$, $SCR_2$, . . . , $SCR_{14}$. When the MPD 302 is utilized to enable multipath detection, for example, the Gold code generation block 314b may enable generation of the scrambling code segment $SCR_0$ from among the plurality of scrambling code segments $SCR_0$, $SCR_1$, $SCR_2$, . . . , $SCR_{14}$. <The scrambling code segment $SCR_0$ may be generated at a time instant $t_{14}$. A time duration that comprises the time instants $t_0$ and $t_{14}$ may comprise a delay spread.

When the MPD 302 is utilized to enable synchronization and timing acquisition, as a group, the plurality of Gold code generation blocks 314a . . . 314b may enable generation of each scrambling code segment within the plurality of scrambling code segments $SCR_0$, $SCR_1$, $SCR_2$, . . . , $SCR_{14}$ to be generated simultaneously. When the MPD 302 is utilized to enable multipath detection, as a group, the plurality of Gold code generation blocks 314a . . . 314b may enable a simultaneous generation of the scrambling code segment $SCR_0$ beginning at a plurality of time instants $t_0, t_1, t_2, \ldots, t_{14}$. The result may be the simultaneous generation of a plurality comprising time shifted versions of the scrambling code segment $SCR_0$.

The descrambler block 316 may comprise suitable logic, circuitry, and/or code that may enable unscrambling of at least one received signal. The descrambler block 316 may unscramble at least one filtered signal received from the CMF block 306. When the MPD 302 is utilized to enable synchronization and timing acquisition, the descrambler block 316 may utilize at least a portion of the simultaneously generated plurality of scrambling code segments $SCR_0$, $SCR_1$, $SCR_2$, . . . , $SCR_{14}$ to unscramble the received signal, and/or filtered signal. For at least one utilized scrambling code segment, among the simultaneously utilized plurality of scrambling code segments $SCR_0$, $SCR_1$, $SCR_2$, . . . , $SCR_{14}$, a corresponding unscrambled signal may be generated.

During multipath detection by the MPD 302, the descrambler block 316 may utilize the plurality of time-shifted versions of a scrambling code segment to unscramble a received plurality of individual path signals, and/or filtered signals associated with a multipath cluster. For at least a portion of the plurality of time-shifted versions of the scrambling code segment, a corresponding unscrambled signal may be generated.

Each of the plurality of energy detector blocks 318a ... 318b may comprise suitable logic, circuitry, and/or code that may enable detection of an energy level in a received signal subsequent to application of a corresponding scrambling code segment from a plurality of scrambling code segments. The energy level may be computed based on the signal received from the descrambler block 316 by the corresponding energy detector block.

The energy reporting block 320 may comprise suitable logic, circuitry, and/or code that may enable computation of an energy level based on a plurality of energy levels received from the plurality of energy detector blocks 318a ... 318b. When the MPD 302 is utilized to enable synchronization and timing acquisition, the energy reporting block 320 may compute an energy level that represents a maximum energy level based on the plurality of energy levels received from the plurality of energy detector blocks 318a ... 318b. During multipath detection by the MPD 302, the energy reporting block 320 may compute an energy level that represents a summation of the plurality of energy levels received from the plurality of energy detector blocks 318a ... 318b.

Figure 4:
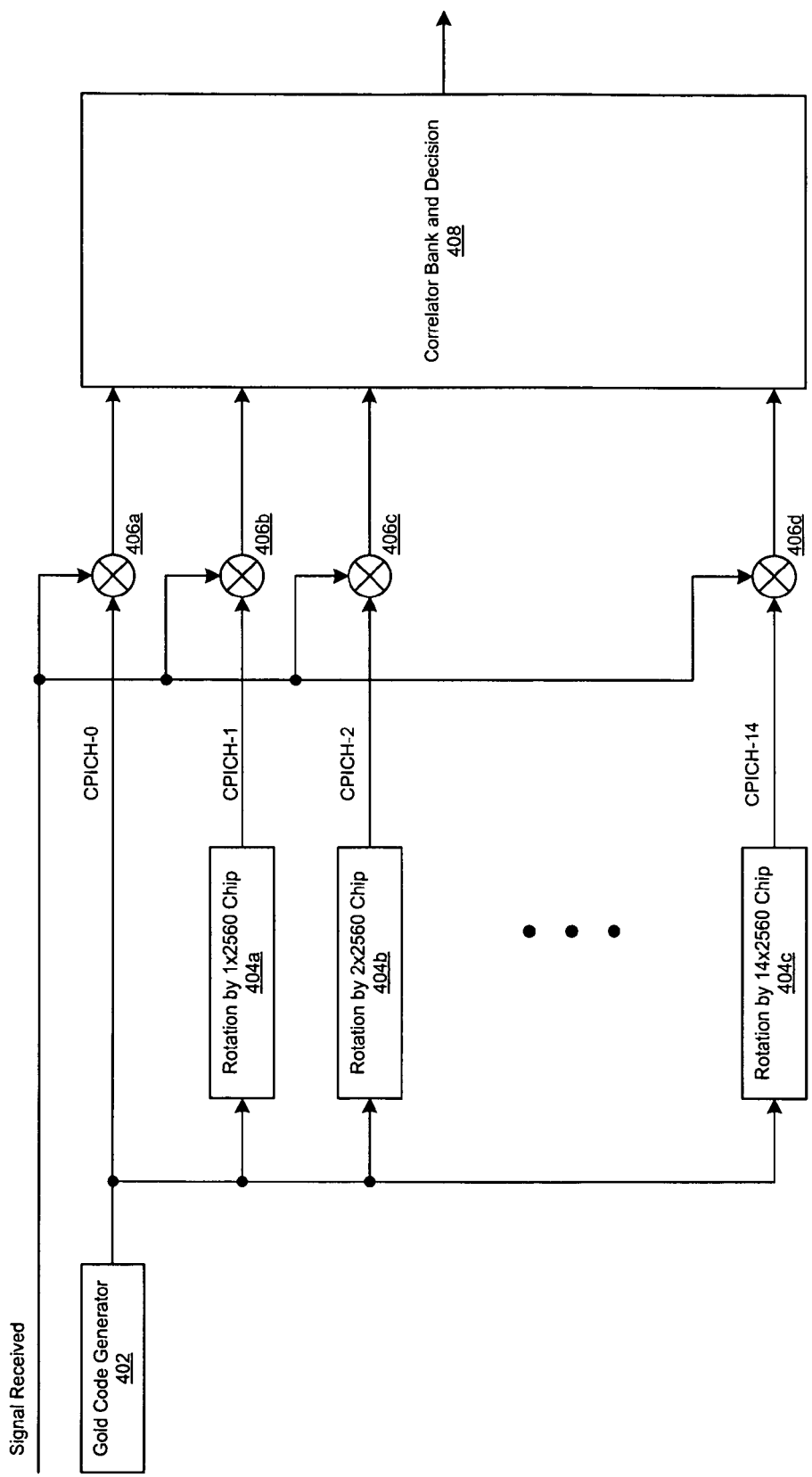
FIG. 4 is a block diagram illustrating exemplary generation of simultaneous scrambling codes, in accordance with an embodiment of the invention.

FIG. 4 is a block diagram illustrating exemplary generation of simultaneous scrambling code segments, in accordance with an embodiment of the invention. Referring to FIG. 4, there is shown a Gold code generator 402, a plurality of rotation blocks 404a, 404b, ..., 404c, a plurality of descrambler blocks 406a, 406b, 406c, ..., 404d, and a correlator bank and decision block 408.

The Gold code generator block 402 may comprise suitable circuitry, logic, and/or code that may enable generation of one or more scrambling code segments. For example, Gold code generator block 402 may be utilized to generate the plurality of scrambling code segments, for example, 252a, 252b, 252c, ..., 252d.

The rotation block 404a may comprise suitable circuitry, logic, and/or code that may enable generation of a one time slot shifted version of a locally generated plurality of scrambling code segments. For example, if the rotation block 404a receives a scrambling code segment 252a input at a time instant corresponding to slot 0 within a received WCDMA frame 204, a time shifted version of the scrambling code segment 252a may be output at a time instant corresponding to slot 1 within the received WCDMA frame 204. If the rotation block 404a receives a scrambling code segment 252b input at a time instant corresponding to slot 1 within the received WCDMA frame 204, a time shifted version of the scrambling code segment 252a may be output at a time instant corresponding to slot 2 within the received WCDMA frame 204. If the rotation block 404a receives a scrambling code segment 252c input at a time instant corresponding to slot 2 within the received WCDMA frame 204, a time shifted version of the scrambling code segment 252a may be output at a time instant corresponding to slot 3 within the received WCDMA frame 204. If the rotation block 404a receives a scrambling code segment 252d input at a time instant corresponding to slot 14 within the received WCDMA frame 204, a time shifted version of the scrambling code segment 252a may be output at a time instant corresponding to slot 0 within a subsequent received WCDMA frame.

The rotation block 404b may comprise suitable circuitry, logic, and/or code that may enable generation of a two time slot shifted version of a received plurality of scrambling code segments. For example, if the rotation block 404b receives a scrambling code segment 252a input at a time instant corresponding to slot 0 within a received WCDMA frame 204, a time shifted version of the scrambling code segment 252a may be output at a time instant corresponding to slot 2 within the received WCDMA frame 204. If the rotation block 404b receives a scrambling code segment 252b input at a time instant corresponding to slot 1 within the received WCDMA frame 204, a time shifted version of the scrambling code segment 252a may be output at a time instant corresponding to slot 3 within the received WCDMA frame 204. If the rotation block 404b receives a scrambling code segment 252c input at a time instant corresponding to slot 2 within the received WCDMA frame 204, a time shifted version of the scrambling code segment 252a may be output at a time instant corresponding to slot 4 within the received WCDMA frame 204. If the rotation block 404b receives a scrambling code segment 252d input at a time instant corresponding to slot 14 within the received WCDMA frame 204, a time shifted version of the scrambling code segment 252a may be output at a time instant corresponding to slot 1 within a subsequent received WCDMA frame.

The rotation block 404c may comprise suitable circuitry, logic, and/or code that may enable generation of a fourteen time slot shifted version of a received plurality of scrambling code segments. For example, if the rotation block 404c receives a scrambling code segment 252a input at a time instant corresponding to slot 0 within a received WCDMA frame 204, a time shifted version of the scrambling code segment 252a may be output at a time instant corresponding to slot 14 within the received WCDMA frame 204. If the rotation block 404c receives a scrambling code segment 252b input at a time instant corresponding to slot 1 within the received WCDMA frame 204, a time shifted version of the scrambling code segment 252a may be output at a time instant corresponding to slot 0 within a subsequent received WCDMA frame. If the rotation block 404c receives a scrambling code segment 252c input at a time instant corresponding to slot 2 within the received WCDMA frame 204, a time shifted version of the scrambling code segment 252a may be output at a time instant corresponding to slot 1 within the subsequent received WCDMA frame. If the rotation block 404c receives a scrambling code segment 252d input at a time instant corresponding to slot 14 within the received WCDMA frame 204, a time shifted version of the scrambling code segment 252a may be output at a time instant corresponding to slot 13 within the subsequent received WCDMA frame.

The descrambler block 406a may comprise suitable logic, circuitry, and/or code that may enable unscrambling of a received signal utilizing a received scrambling code segment. The descrambler block 406b may comprise suitable logic, circuitry, and/or code that may enable unscrambling of the received signal utilizing a received one time slot shifted version of the scrambling code segment. The descrambler block 406c may comprise suitable logic, circuitry, and/or code that may enable unscrambling of the received signal utilizing a received two time slot shifted version of the scrambling code segment. The descrambler block 406d may comprise suitable logic, circuitry, and/or code that may enable unscrambling of the received signal utilizing a received fourteen time slot shifted version of the scrambling code segment.

The correlator bank and decision block 408 may comprise suitable logic, circuitry, and/or code that may enable detection of a plurality of energy levels in a corresponding plurality of received signals. The correlator bank and decision block 408 may subsequently determine a maximum energy level among the detected plurality of energy levels.

In operation, a signal may be received. The received signal may be input to each of the plurality of descrambler blocks 406a, 406b, 406c, ..., 406d. The Gold code generator 402 may generate a plurality of scrambling code segments that may span a time duration associated with a WCDMA frame.

The plurality of scrambling code segments may be input to each of the plurality of rotation blocks 404a, 404b, ..., 404c. The scrambling code segment, and each of the plurality of time shifted versions may be input to a corresponding descrambler block 406a, 406b, 406c, ..., 406d. Each of the plurality of descrambler blocks 406a, 406b, 406c, ..., 406d may apply the corresponding scrambling code segment to the received signal. The correlator bank and decision block 408 may detect an energy level associated with each of the signals generated based on application of a corresponding scrambling code segment, and determine a maximum energy level among the plurality of detected energy levels.

With reference to FIG. 4, the Gold code generator 402, and plurality of rotation blocks 404a, 404b, ..., 404c may correspond to the plurality of Gold code generation blocks 314a ... 314b. The plurality of descrambler blocks 406a, 406b, 406c, ..., 406d may correspond to the descrambler block 316. The correlator bank and decision block 408 may correspond to the plurality of energy detector blocks 318a ... 318b, and energy reporting block 320.

Figure 5:
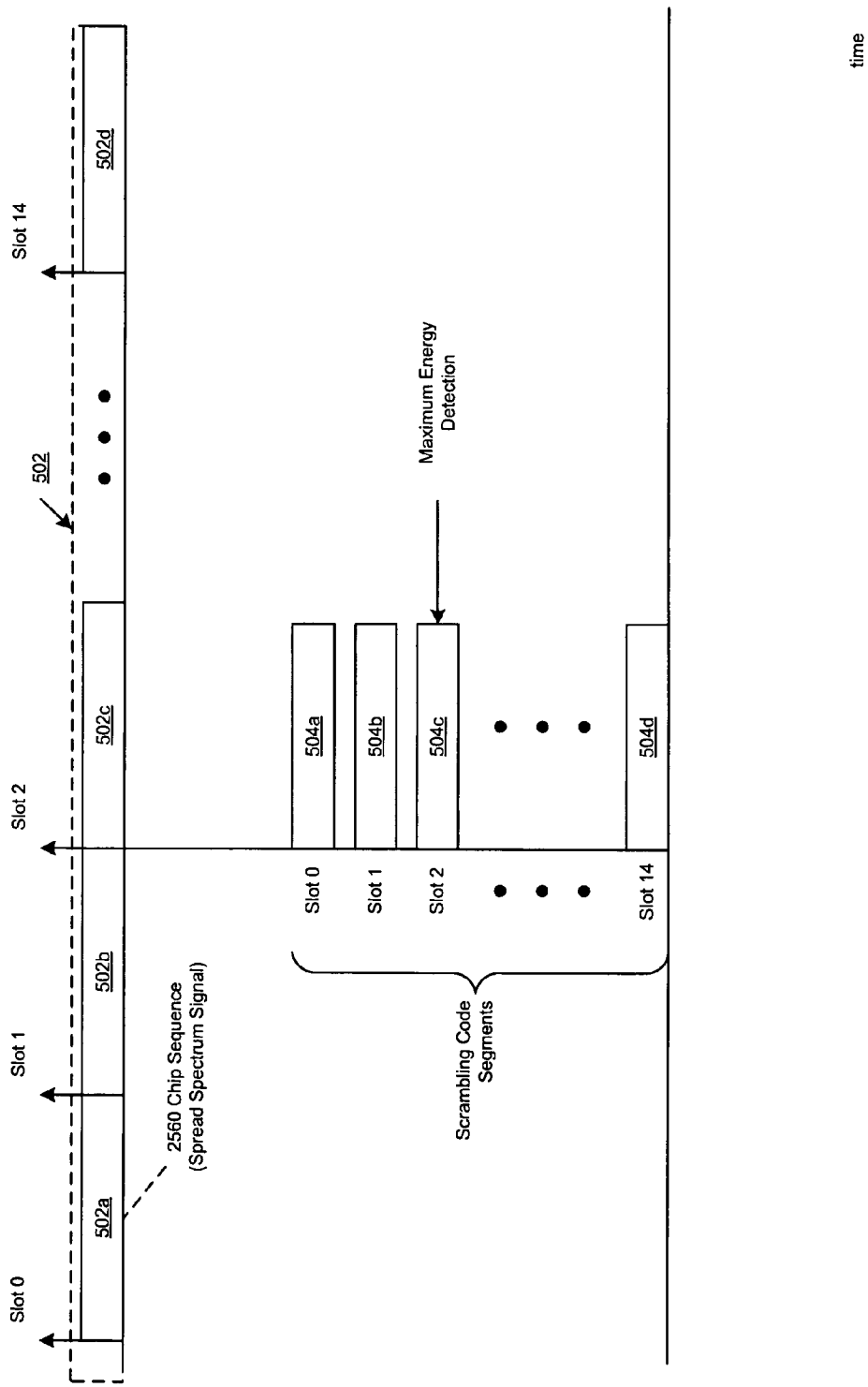
FIG. 5 is an exemplary illustration of frame synchronization, in accordance with an embodiment of the invention.

FIG. 5 is an exemplary illustration of frame synchronization, in accordance with an embodiment of the invention. Referring to FIG. 5, there is shown a spread spectrum frame 502, and a plurality of scrambling code segments 504a, 504b, 504c, ..., 504d. The spread spectrum frame 502 may further comprise a plurality of slots 502a, 502b, 502c, ... 502d. Also shown in FIG. 5 is a plurality of time instants Slot 0, Slot 1, Slot 2, ..., Slot 14. The time instants may be defined relative to a transmitting base station 122. The time instant Slot 0 may correspond to the beginning of the slot 502a. The time instant Slot 1 may correspond to the beginning of the slot 502b. The time instant Slot 2 may correspond to the beginning of the slot 502c. The time instant Slot 14 may correspond to the beginning of the slot 502d.

The spread spectrum frame 502 may represent a signal received by a mobile terminal 110 that was transmitted by a base station 122 in a neighboring cell. The slot 502a may represent scrambled information, for example CPICH information that was transmitted during slot 0 within the frame 502. The slot 502b may represent scrambled information that was transmitted during slot 1 within the frame 502. The slot 502c may represent scrambled information that was transmitted during slot 2 within the frame 502. The frame 502 may be substantially as described for frame 204, in various embodiments of the invention. The slot 502d may represent scrambled information that was transmitted during slot 14 within the frame 502. Each of the plurality of slots 502a, 502b, 502c, ..., 502d may comprise 2560 chips, for example.

The scrambling code segment 504a may represent at least a portion of the scrambling code that was utilized to scramble information contained in slot 502a. In an exemplary embodiment of the invention, the scrambling code segment may comprise 2,048 chips. The exemplary scrambling code segment 504a may be utilized to unscramble information contained in a corresponding 2,048 chips within the slot 502a. The exemplary scrambling code segment 504a may represent at least a portion of a corresponding scrambling code utilized by the base station 122 to scramble information contained within the slot 502a.

The scrambling code segment 504b may represent at least a portion of the scrambling code that was utilized to scramble information contained in slot 502b. In an exemplary embodiment of the invention, the scrambling code segment may comprise 2,048 chips. The exemplary scrambling code segment 504b may be utilized to unscramble information contained in a corresponding 2,048 chips within the slot 502b. The exemplary scrambling code segment 504b may represent at least a portion of a corresponding scrambling code utilized by the base station 122 to scramble information contained within the slot 502b.

The scrambling code segment 504c may represent at least a portion of the scrambling code that was utilized to scramble information contained in slot 502c. In an exemplary embodiment of the invention, the scrambling code segment may comprise 2,048 chips. The exemplary scrambling code segment 504c may be utilized to unscramble information contained in a corresponding 2,048 chips within the slot 502c. The exemplary scrambling code segment 504c may represent at least a portion of a corresponding scrambling code utilized by the base station 122 to scramble information contained within the slot 502c.

The scrambling code segment 504d may represent at least a portion of the scrambling code that was utilized to scramble information contained in slot 502d. In an exemplary embodiment of the invention, the scrambling code segment may comprise 2,048 chips. The exemplary scrambling code segment 504d may be utilized to unscramble information contained in a corresponding 2,048 chips within the slot 502d. The exemplary scrambling code segment 504d may represent at least a portion of a corresponding scrambling code utilized by the base station 122 to scramble information contained within the slot 502d. In various embodiments of the invention, the scrambling code segments 504a, 504b, 504c, ..., 504d may not be limited to a length of 2,048 chips and/or the number of scrambling code segments may not be limited to 15.

In operation, slot synchronization may be achieved between the mobile terminal 110 and the base station 122. Based on configuration information received via a neighbor set list from the base station 120 in an active cell, the mobile terminal 110 may select one or more scrambling code segments 504a, 504b, 504c, ..., 504d, that may be utilized to unscramble the received frame 502.

Prior to establishment of frame synchronization at the mobile terminal 110, the mobile terminal 110 may associate the time instants Slot 0, Slot 1, Slot 2, ..., Slot 14 with the beginnings of slots within the frame 502 but may not associate a time instant with the beginning of a specific slot in the frame. For example, the mobile terminal 110 may not associate the time instant Slot 0 with the beginning of the slot 502a prior to establishment of frame synchronization.

In various embodiments of the invention, each of the plurality of scrambling code segments 504a, 504b, 504c, ..., 504d may be applied simultaneously to at least a portion of the received frame 502. As shown in FIG. 5, the scrambling code segments may be utilized within a time duration corresponding to slot 2 within the frame 502. The scrambling code segment 504a may be applied to the received slot 502c. A corresponding signal $S_0$ may be generated based on the application of the scrambling code segment 504a. A corresponding energy level associated with the signal $S_0$, $E(S_0)$, may be computed. The scrambling code segment 504b may be applied to the received slot 502c. A corresponding signal $S_1$ may be generated based on the application of the scrambling code segment 504b. A corresponding energy level associated with the signal $S_1$, $E(S_1)$, may be computed. The scrambling code segment 504c may be applied to the received slot 502c. A corresponding signal $S_2$ may be generated. A corresponding energy level associated with the signal $S_2$, $E(S_2)$, may be computed. The scrambling code segment 504d may be applied to the received slot 502c. A corresponding signal $S_{14}$ may be generated. A corresponding energy level associated with the signal $S_{14}$, $E(S_{14})$, may be computed.

After computing an energy level associated with application of each scrambling code segment 502a, 502b, 502c, ..., 502d, the corresponding energy levels, $E(S_0)$, $E(S_1), E(S_2), ..., E(S_{14})$ may be compared. As shown in FIG. 5, the energy level associated with the scrambling code segment 504c, $E(S_2)$, may have the highest value among the plurality of computed energy levels. The scrambling code segment 504c may be utilized to unscramble scrambled information contained in slot 2 within the frame 502, transmitted by the base station 122, when the energy level $E(S_2)$ is greater than a threshold value, for example. Based on this result, the mobile terminal 110 may be able to determine that the slot 502c may represent slot 2 in a WCDMA frame 502 transmitted by the base station 122. Having identified slot 2 within the WCDMA frame 502, the mobile terminal 110 may be able to determine that the next slot boundary may indicate the beginning of slot 3. Based on the result of the energy level comparison, the mobile terminal 110 may achieve frame synchronization with the base station 122. The mobile terminal 110 may achieve synchronization and timing acquisition with the base station 122 in a two step process.

In various embodiments of the invention, the mobile terminal 110 may select a subsequent plurality of scrambling code segments when the energy level $E(S_2)$, for example, is not greater than the threshold value. The subsequent plurality of scrambling code segments may be derived based on information contained in a neighbor set list. The second step in the two step process may be repeated based on the subsequent plurality of scrambling code segments. The subsequent plurality of scrambling code segments may be applied simultaneously to at least a portion of a subsequent received frame 502 transmitted by the base station 122 substantially as described above.

In various embodiments of the invention, the mobile terminal 110 may repeat the first step in the two step process to establish slot synchronization with a subsequent base station associated with a received neighbor set list. The mobile terminal 110 may then perform the second step in the two step process based on the new slot synchronization. The mobile terminal may apply a plurality of scrambling code segments that may be simultaneously applied to at least a portion of a frame received from the subsequent base station substantially as described above.

The processes as described above may be repeated until each of the base stations associated with the received neighbor set list have been associated with a corresponding plurality of scrambling code segments that may be utilized to unscramble scrambled information contained within a frame received from the corresponding base station.

Figure 6:
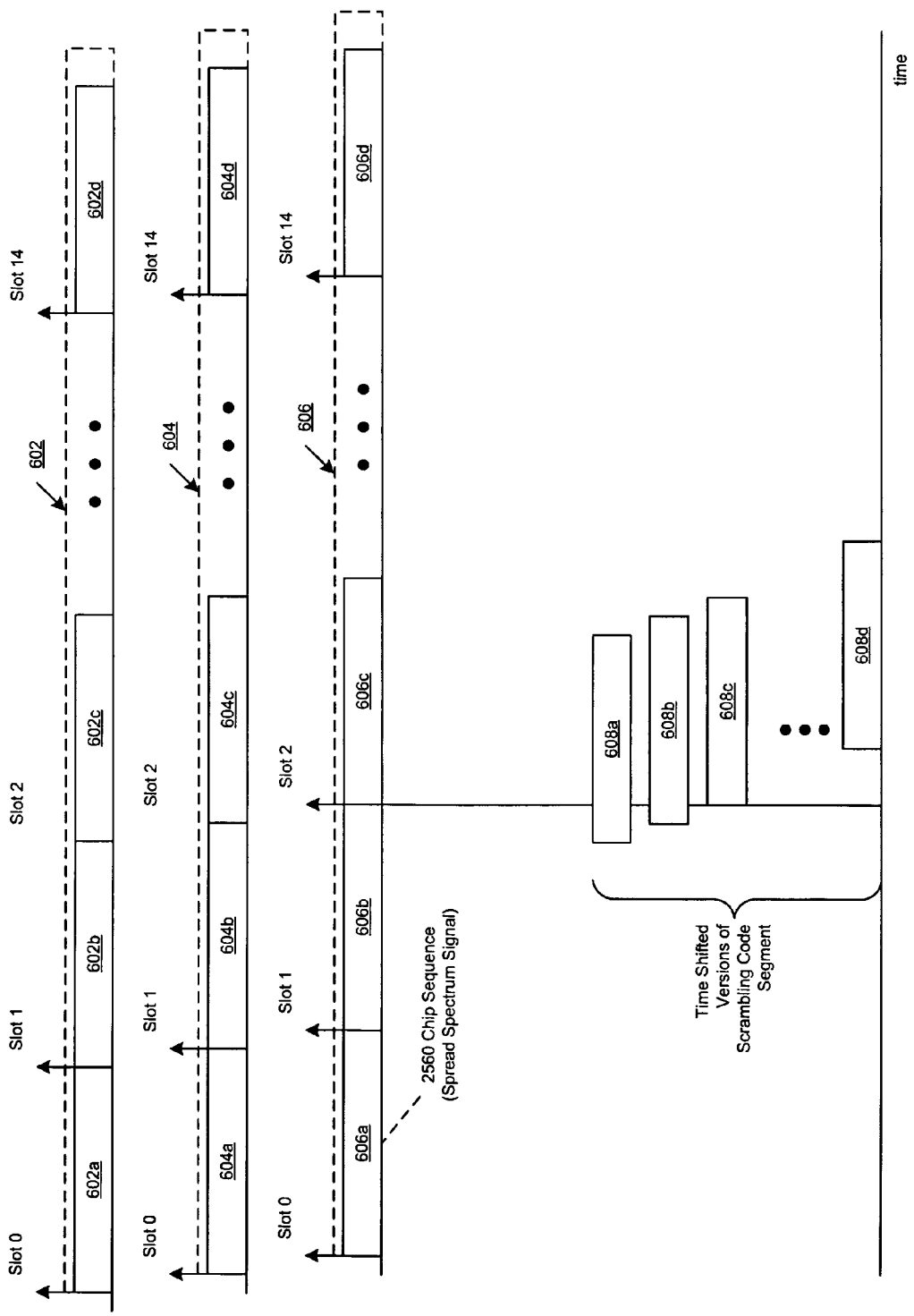
FIG. 6 is an exemplary illustration of multipath detection, in accordance with an embodiment of the invention.

FIG. 6 is an exemplary illustration of multipath detection, in accordance with an embodiment of the invention. Referring to FIG. 6, there is shown a plurality of spread spectrum frames 602, 604, and 606, and a plurality of scrambling code segments 608a, 608b, 608c, ..., 608d. The spread spectrum frame 602 may further comprise a plurality of slots 602a, 602b, 602c, ... 602d. The spread spectrum frame 604 may further comprise a plurality of slots 604a, 604b, 604c, ... 604d. The spread spectrum frame 606 may further comprise a plurality of slots 606a, 606b, 606c, ... 606d.

The plurality of spread spectrum frames 602, 604, and 606 may comprise at least a portion of a multipath cluster based on a signal that was transmitted by a base station 122 in a neighboring cell. Each of the plurality of spread spectrum frames 602, 604, and 606 may represent an individual path signal received by a mobile terminal 110, for example. The frame 602 may arrive at the mobile terminal 110 at a time instant $t_0$. The frame 604 may arrive at the mobile terminal 110 at a subsequent time instant $t_1$. The frame 606 may arrive at the mobile terminal 110 at a subsequent time instant $t_2$.

The slot 602a may represent scrambled information that was transmitted during slot 0 within a transmitted frame. The slot 602b may represent scrambled information that was transmitted during slot 1 within the transmitted frame. The slot 602c may represent scrambled information that was transmitted during slot 2 within the transmitted frame. The slot 602d may represent scrambled information that was transmitted during slot 14 within the transmitted frame.

The slot 604a may represent scrambled information that was transmitted during slot 0 within the transmitted frame. The slot 604b may represent scrambled information that was transmitted during slot 1 within the transmitted frame. The slot 604c may represent scrambled information that was transmitted during slot 2 within the transmitted frame. The slot 604d may represent scrambled information that was transmitted during slot 14 within the transmitted frame.

The slot 606a may represent scrambled information that was transmitted during slot 0 within the transmitted frame. The slot 606b may represent scrambled information that was transmitted during slot 1 within the transmitted frame. The slot 606c may represent scrambled information that was transmitted during slot 2 within the transmitted frame. The slot 606d may represent scrambled information that was transmitted during slot 14 within the transmitted frame. Each of the plurality of slots 602a, 602b, 602c, ..., 602d, 604a, 604b, 604c, ..., 604d, and 606a, 606b, 606c, ..., 606d may comprise 2,560 chips, for example. The scrambling code segment 608a may represent at least a portion of the scrambling code that was utilized to scramble information contained in slots 602c, 604c, and 606c. The scrambling code segments 608b, 608c, ..., 608d may represent time shifted versions of the scrambling code segment 608a.

In operation, individual path signals received by the mobile terminal 110 may be detected. The mobile terminal 110 may apply the scrambling code segment 608a to at least a portion of the individual path signals associated with corresponding frames 602, 604, and 606 beginning at a time instant $ts_0$. Corresponding energy levels associated with the signals may be computed. For example, $E(S_{00})$ may represent an energy level corresponding to the application of the scrambling code segment 608a to at least a portion of the individual path signal associated with the frame 602. $E(S_{01})$ may represent an energy level corresponding to the application of the scrambling code segment 608a to at least a portion of the individual path signal associated with the frame 604. $E(S_{02})$ may represent an energy level corresponding to the application of the scrambling code segment 608a to at least a portion of the individual path signal associated with the frame 606. A computed energy level, for example $SE(S_0)$, may represent a sum of energy levels $E(S_{00})$, $E(S_{01})$, and $E(S_{02})$, associated with individual path signals within a multipath cluster. The energy level $E(S_{00})$ may be greater than zero and may represent coherent energy. The energy levels $E(S_{01})$ and $E(S_{02})$ may be about equal to zero and may represent noncoherent energy. Based on the energy level $E(S_{00})$, the scrambling code segment 608a may be utilized to unscramble scrambled information contained in an individual path signal associated with the frame 602.

The mobile terminal 110 may apply the scrambling code segment 608b to at least a portion of the individual path signals associated with the corresponding frames 602, 604, and 606 beginning at a time instant $ts_1$. Corresponding energy levels associated with the signals may be computed. For example, $E(S_{10})$ may represent an energy level corresponding to the application of the scrambling code segment 608b to at least a portion of the individual path signal associated with the frame 602. $E(S_{11})$ may represent an energy level corresponding to the application of the scrambling code segment 608b to at least a portion of the individual path signal associated with the frame 604. $E(S_{12})$ may represent an energy level corresponding to the application of the scrambling code segment 608a to at least a portion of the individual path signal associated with the frame 606. A computed energy level, for example $SE(S_1)$, may represent a sum of energy levels $E(S_{10})$, $E(S_{11})$, and $E(S_{12})$, associated with individual path signals within the multipath cluster. The energy level $E(S_{11})$ may be greater than zero and may represent coherent energy. The energy levels $E(S_{10})$ and $E(S_{12})$ may be about equal to zero and may represent noncoherent energy. Based on the energy level $E(S_{11})$, the scrambling code segment 608b may be utilized to unscramble scrambled information contained in an individual path signal associated with the frame 604.

The mobile terminal 110 may apply the scrambling code segment 608c to at least a portion of the individual path signals associated with the corresponding frames 602, 604, and 606 beginning at a time instant $ts_2$. Corresponding energy levels associated with the signals may be computed. For example, $E(S_{20})$ may represent an energy level corresponding to the application of the scrambling code segment 608c to at least a portion of the individual path signal associated with the frame 602. $E(S_{21})$ may represent an energy level corresponding to the application of the scrambling code segment 608c to at least a portion of the individual path signal associated with the frame 604. $E(S_{22})$ may represent an energy level corresponding to the application of the scrambling code segment 608c to at least a portion of the individual path signal associated with the frame 606. A computed energy level, for example $SE(S_2)$, may represent a sum of energy levels $E(S_{20})$, $E(S_{21})$, and $E(S_{22})$, associated with individual path signals within the multipath cluster. The energy level $E(S_{20})$ may be greater than zero and may represent coherent energy. The energy levels $E(S_{21})$ and $E(S_{22})$ may be about equal to zero and may represent noncoherent energy. Based on the energy level $E(S_{22})$, the scrambling code segment 608c may be utilized to unscramble scrambled information contained in an individual path signal associated with the frame 606.

The mobile terminal 110 may apply the scrambling code segment 608d to at least a portion of the individual path signals associated with the corresponding frames 602, 604, and 606 beginning at a time instant $ts_{14}$. Corresponding energy levels associated with the signals may be computed. For example, $E(S_{30})$ may represent an energy level corresponding to the application of the scrambling code segment 608d to at least a portion of the individual path signal associated with the frame 602. $E(S_{31})$ may represent an energy level corresponding to the application of the scrambling code segment 608d to at least a portion of the individual path signal associated with the frame 604. $E(S_{32})$ may represent an energy level corresponding to the application of the scrambling code segment 608d to at least a portion of the individual path signal associated with the frame 606. A computed energy level, for example $SE(S_3)$, may represent a sum of energy levels $E(S_{30})$, $E(S_{31})$, and $E(S_{32})$, associated with individual path signals within the multipath cluster.

In various embodiments of the invention, a total energy level associated with the multipath cluster, $TE(S)$, may be computed based on a sum of the computed energy levels $SE(S_0)$, $SE(S_1)$, $SE(S_2)$, and $SE(S_3)$, for example. The total energy level $TE(S)$ may be reported by the energy reporting block 320.

Figure 7:
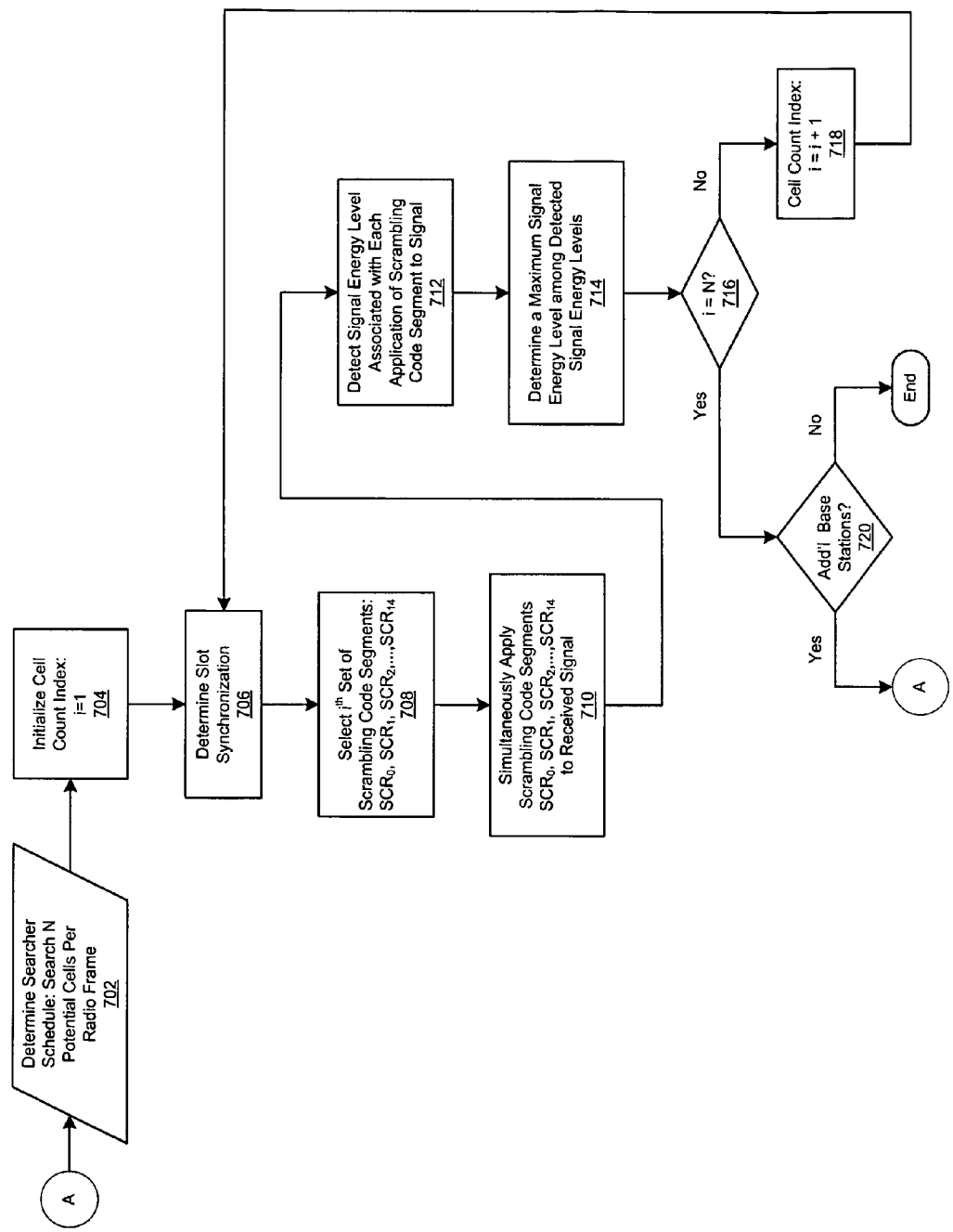
FIG. 7 is a flow chart illustrating exemplary steps for frame synchronization, in accordance with an embodiment of the invention.

FIG. 7 is a flow chart illustrating exemplary steps for frame synchronization, in accordance with an embodiment of the invention. The process represented in the flow chart of FIG. 7 may comprise establishment of slot synchronization with one of a plurality of base stations associated with a neighbor set list. The neighbor set list may be utilized to generate a plurality of potential scrambling codes that may be utilized to establish frame synchronization with the base station. A plurality of scrambling code segments may be determined based on one of the plurality of potential scrambling codes. If frame synchronization is not established based on the plurality of scrambling code segments, a subsequent one of the plurality of potential scrambling codes may be selected, and a subsequent plurality of scrambling code segments determined.

A subsequent establishment of slot synchronization may be performed with a subsequent one of the plurality of base stations associated with the neighbor set list. The neighbor set list may be utilized to generate a subsequent plurality of scrambling codes based on the subsequent establishment of slot synchronization. Frame synchronization may be established with the subsequent one of the plurality of base stations substantially as described above.

Referring to FIG. 7, in step 702, a searcher schedule may be determined. During the determination of the searcher schedule the first step in the two step process may be performed to enable determination of slot synchronization with the selected base station associated with a neighbor set list. The schedule may be utilized to enable the MPD 302 to attempt to achieve frame synchronization with base stations in a plurality of N cells within a time duration corresponding to a frame. The N cells may correspond to base stations associated with the neighbor set list. In step 704, a cell counter index may be initialized to a value 1. In step 706, slot synchronization may be achieved in the current cell. In step 708, an $i^{th}$ set of scrambling code segments $SCR_0$, $SCR_1$, $SCR_2$, ..., $SCR_{14}$, may be selected. The set of synchronization codes may be selected based on configuration information contained within a neighbor set list.

In step 710, the set of scrambling code segments $SCR_0$, $SCR_1$, $SCR_2$, ..., $SCR_{14}$ may be simultaneously applied to a received signal. In step 712, an energy level may be detected corresponding to each of the simultaneous applications of the set of scrambling code segments $SCR_0$, $SCR_1$, $SCR_2$, ..., $SCR_{14}$. In step 714, a maximum energy level may be determined from among the set of detected energy levels. The maximum energy level may be compared with a threshold energy level. If the maximum energy level not less than the threshold energy level, the scrambling code segment may be utilized to determine frame synchronization with respect to the current cell. Step 716 may determine if the current cell corresponds to the last among the plurality of N cells. If step 716 determines that the current cell is the last cell among the plurality of N cells currently being searched, step 720 may determine if there are additional cells from the neighbor set list to be searched. If there are additional cells to be searched, step 702 may follow. If there are no additional cells to be searched, the frame synchronization process may be completed. If step 716 determines that the current cell is not the last cell, in step 718, the cell count index may be incremented. Step 706 may follow step 718.

Figure 8:
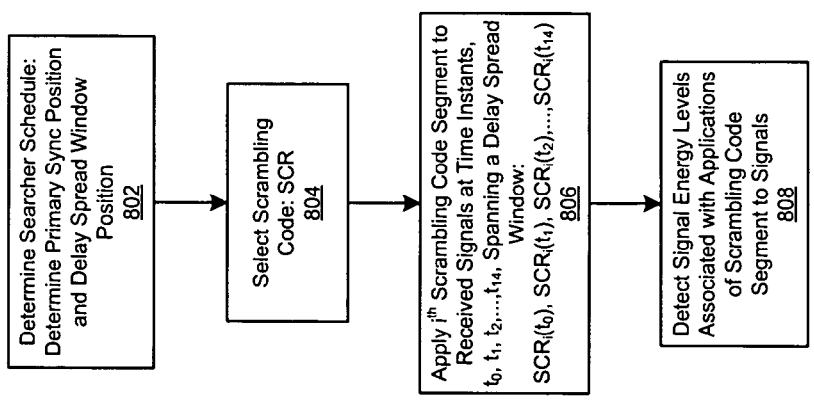
FIG. 8 is a flow chart illustrating exemplary steps for multipath detection, in accordance with an embodiment of the invention.

FIG. 8 is a flow chart illustrating exemplary steps for multipath detection, in accordance with an embodiment of the invention. The process represented in the flow chart of FIG. 8 may comprise detection of aggregate energy detected in a received signal cluster based on application of a plurality of time shifted versions of a scrambling code segment to the individual path signals associated with the signal cluster.

Referring to FIG. 8, in step 802, a searcher schedule may be determined. The schedule may be utilized to enable the MPD 302 to attempt to perform multipath detection of signals received from a base station. A primary synchronization position time instant, $t_{sync}$, and a delay spread window time duration, $\Delta t$, may be determined, for example. The primary synchronization position may correspond to the slot timing determined based on the slot timing process as described above. The delay spread window time duration may be measured in chips, for example $\Delta t=14$ chips. The temporal position associated with the delay spread window may be determined based on a delay spread window position time instant, $t_{Win\_Pos}$. The delay spread window position time instant may correspond to a time instant that precedes the primary synchronization position time instant corresponding to a current slot within a WCDMA frame.

Based on the primary synchronization position time instant and delay spread window time duration, a plurality of time shifted versions of a scrambling code segment may be generated and applied to individual path signals associated with the signal cluster. For example, given a delay spread window time duration comprising 14 chips, a plurality of 14 time shifted versions of the scramble code segment may be generated, wherein one of the plurality of scrambling code segments associated with a delay spread window may not be time shifted. The interval spacing between time shifted versions may be 1 chip, for example. Any one of the time shifted versions of the scrambling code segment may be time shifted by 1 chip later in time than a preceding time shifted version, and/or 1 chip earlier in time than a succeeding time shifted version, for example. Other embodiments of the invention may utilize a plurality of time shifted versions that may be greater than or less than 15, and/or utilize an interval spacing of greater than or less than 1 chip. Generation and application of a first time shifted version of the scrambling code segment may begin at a time instant $t_{Win\_Pos}$, for example. Generation and application of a last time shifted version of the scrambling code may begin at a time instant, for example $(t_{Win\_Pos}+\Delta t)$.

In step 804, a scrambling code, for example SCR, may be selected. The scrambling code may be selected from a plurality of candidate scrambling codes based on information contained in the neighbor set list. In step 806, an $i^{th}$ scrambling code segment $SCR_i$, associated with the scrambling code selected in step 804, may be applied to received signals at distinct time instants, $t_0, t_1, t_2, \ldots, t_{14}$, for example. The distinct time instants may span a delay spread window. The beginning of the delay spread window may correspond to the delay spread window time instant, $t_{Win\_Pos}$, associated with a current time slot within a WCDMA frame. Consecutive time instants $t_n$ and $t_{n+1}$, where n may represent a numerical index, may span a time duration associated with a chip. In step 808, energy levels may be detected based on the application of the plurality of time shifted versions of the scrambling code segment $SCR_0(t_0), SCR_0(t_1), SCR_0(t_2), \ldots, SCR_0(t_{14})$. An aggregate energy level may be reported by the energy reporting block 320, for example.

Aspects of a system for new cell identification in a WCDMA network with a given neighbor set may comprise a baseband processor 154 that enables determination of a primary synchronization position and at least one scrambling code based on received configuration information from one or more base stations 110. The baseband processor 154 may also enable determination of a slot boundary in at least one signal received from the one or more base stations 110 based on the determined primary synchronization position. The system may also comprise an MPD 302 that enables unscrambling of the received at least one signal based on the determined slot boundary and at least a portion of the one or more scrambling codes.

The MPD 302 may enable selection of at least one subsequent scrambling code from among said at least one scrambling code. The MPD 302 may also enable an unscrambling of the received at least one signal based on at least a portion of the selected at least one scrambling code, and/or on at least a portion of the at least one subsequent scrambling code. The received one or more signals may be simultaneously unscrambled based on the at least a portion of the selected one or more scrambling codes, and/or the at least a portion of the one or more subsequent scrambling codes.

The MPD 302 may enable detection of at least one signal energy level associated with a corresponding unscrambled received one or more signals. The MPD 302 may enable determination of a maximum signal energy level from among the one or more signal energy levels. The MPD 302 may enable communication with one of the one or more base stations based on the selected one or more scrambling codes, and/or the one or more subsequent scrambling codes. The scrambling codes and/or subsequent scrambling codes may be determined based on the maximum at least one signal energy level.

In another aspect of the system, the MPD 302 may enable unscrambling of at least one of a plurality of individual path signals received from the one or more base stations 120 based on at least a portion of one of the at least one scrambling code at a current time instant. The MPD 302 may also enable unscrambling of the received at least one of the plurality of individual path signals based on at least a portion of one of the one or more scrambling code. The scrambling codes may be utilized at one or more subsequent time instants. The MPD 302 may enable detection of at least one signal energy level associated with a corresponding unscrambled version of the received one or more individual path signals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing signals in a communication system, the method comprising:

performing by one or more processors and/or circuits:

determining a primary synchronization position and a plurality of scrambling codes based on received configuration information from at least one base station;

determining a slot boundary in at least one signal received from said at least one base station based on said determined primary synchronization position;

concurrently applying segments of said plurality of scrambling codes to said received at least one signal based on said determined slot boundary, wherein:

said concurrent applying is performed during one or both of a single slot time duration and a time duration comprising said single slot time duration and a delay spread window time duration; and said delay spread window time duration comprises a portion of said single slot time duration; and unscrambling said received at least one signal based on at least a portion of said plurality of scrambling codes.

2. The method according to claim 1, comprising selecting from said plurality of scrambling codes, at least one scrambling code and at least one subsequent scrambling code.

3. The method according to claim 2, comprising unscrambling said received at least one signal based on one or both of at least a portion of said selected at least one scrambling code and/or at least a portion of said at least one subsequent scrambling code.

4. The method according to claim 3, comprising simultaneously applying said at least a portion of said selected at least one scrambling code and said at least a portion of said at least one subsequent scrambling code to said received at least one signal.

5. The method according to claim 4, comprising detecting at least one signal energy level associated with a corresponding said simultaneous applying.

6. The method according to claim 5, comprising determining a maximum of said at least one signal energy level.

7. The method according to claim 6, comprising communicating with one of said at least one base station based on selected one of said selected at least one scrambling code and said at least one subsequent scrambling code, wherein said selected one is determined based on said maximum of said at least one signal energy level.

8. The method according to claim 1, comprising unscrambling at least one of a plurality of individual path signals received from said at least one base station based on at least a portion of one of said plurality of scrambling codes at a current time instant.

9. The method according to claim 8, comprising unscrambling said received at least one of said plurality of individual path signals based on said at least a portion of one of said plurality of scrambling codes in at least one subsequent time instant.

10. The method according to claim 9, comprising detecting at least one signal energy level associated with a corresponding one of said unscrambled received at least one of said plurality of individual path signals.

11. A non-transitory computer-readable storage medium having stored thereon, a computer program having at least one code section for processing signals in a communication system, the at least one code section being executable by a computer for causing the computer to perform steps comprising:

determining a primary synchronization position and a plurality of scrambling codes based on received configuration information from at least one base station;

determining a slot boundary in at least one signal received from said at least one base station based on said determined primary synchronization position;

concurrently applying segments of said plurality of scrambling codes to said received at least one signal based on said determined slot boundary, wherein:

said concurrent applying is performed during one or both of a single slot time duration and a time duration comprising said single slot time duration and a delay spread window time duration; and said delay spread window time duration comprises a portion of said single slot time duration; and unscrambling said received at least one signal based on at least a portion of said plurality of scrambling codes.

12. The non-transitory computer-readable storage medium according to claim 11, wherein said at least one code section comprises code for selecting from said plurality of scrambling codes, at least one scrambling code and at least one subsequent scrambling code.

13. The non-transitory computer-readable storage medium according to claim 12, wherein said at least one code section comprises code for unscrambling said received at least one signal based on one or both of at least a portion of said selected at least one scrambling code and/or at least a portion of said at least one subsequent scrambling code.

14. The non-transitory computer-readable storage medium according to claim 13, wherein said at least one code section comprises code for simultaneously applying said at least a portion of said selected at least one scrambling code and said at least a portion of said at least one subsequent scrambling code to said received at least one signal.

15. The non-transitory computer-readable storage medium according to claim 14, wherein said at least one code section comprises code for detecting at least one signal energy level associated with a corresponding said simultaneous applying.

16. The non-transitory computer-readable storage medium according to claim 15, wherein said at least one code section comprises code for determining a maximum of said at least one signal energy level.

17. The non-transitory computer-readable storage medium according to claim 16, wherein said at least one code section comprises code for communicating with one of said at least one base station based on selected one of said selected at least one scrambling code and said at least one subsequent scrambling code, wherein said selected one is determined based on said maximum of said at least one signal energy level.

18. The non-transitory computer-readable storage medium according to claim 11, wherein said at least one code section comprises code for unscrambling at least one of a plurality of individual path signals received from said at least one base station based on at least a portion of one of said plurality of scrambling codes at a current time instant.

19. The non-transitory computer-readable storage medium according to claim 18, wherein said at least one code section comprises code for unscrambling said received at least one of said plurality of individual path signals based on said at least a portion of one of said plurality of scrambling codes in at least one subsequent time instant.

20. The non-transitory computer-readable storage medium according to claim 19, wherein said at least one code section comprises code for detecting at least one signal energy level associated with a corresponding one of said unscrambled received at least one of said plurality of individual path signals.

21. A system for processing signals in a communication system, the system comprising:
  one or more circuits that are operable to determine a primary synchronization position and a plurality of scrambling codes based on received configuration information from at least one base station;
  said one or more circuits are operable to determine a slot boundary in at least one signal received from said at least one base station based on said determined primary synchronization position;
  said one or more circuits are operable to concurrently apply segments of said plurality of scrambling codes to said received at least one signal based on said determined slot boundary, wherein:
    said concurrent applying is performed during one or both of a single slot time duration and a time duration comprising said single slot time duration and a delay spread window time duration; and
    said delay spread window time duration comprises a portion of said single slot time duration; and
  said one or more circuits are operable to unscramble said received at least one signal based on at least a portion of said plurality of scrambling codes.

22. The system according to claim 21, wherein said one or more circuits are operable to select from said plurality of scrambling codes, at least one scrambling code and at least one subsequent scrambling code.

23. The system according to claim 22, wherein said one or more circuits are operable to unscramble said received at least one signal based on one or both of at least a portion of said selected at least one scrambling code and/or at least a portion of said at least one subsequent scrambling code.

24. The system according to claim 23, wherein said one or more circuits are operable to simultaneously apply said at least a portion of said selected at least one scrambling code and said at least a portion of said at least one subsequent scrambling code to said received at least one signal.

25. The system according to claim 24, wherein said one or more circuits are operable to detect at least one signal energy level associated with a corresponding said simultaneous applying.

26. The system according to claim 25, wherein said one or more circuits are operable to determine a maximum of said at least one signal energy level.

27. The system according to claim 26, wherein said one or more circuits are operable to communicate with one of said at least one base station based on selected one of said selected at least one scrambling code and said at least one subsequent scrambling code, wherein said selected one is determined based on said maximum of said at least one signal energy level.

28. The system according to claim 21, wherein said one or more circuits are operable to unscramble at least one of a plurality of individual path signals received from said at least one base station based on at least a portion of one of said plurality of scrambling codes at a current time instant.

29. The system according to claim 28, wherein said one or more circuits are operable to unscramble said received at least one of said plurality of individual path signals based on said at least a portion of one of said plurality of scrambling codes in at least one subsequent time instant.

30. The system according to claim 29, wherein said one or more circuits are operable to detect at least one signal energy level associated with a corresponding one of said unscrambled received at least one of said plurality of individual path signals.

* * * * *